United States Patent
Ishida et al.

(10) Patent No.: US 8,628,883 B2
(45) Date of Patent: Jan. 14, 2014

(54) POSITIVE ELECTRODE FOR RECHARGEABLE LITHIUM BATTERY AND RECHARGEABLE LITHIUM BATTERY INCLUDING SAME

(75) Inventors: Sumihito Ishida, Yongin-si (KR);
Jung-Woo An, Yongin-si (KR);
Kyeu-Yoon Sheem, Yongin-si (KR);
Jin-Man Jeoung, Yongin-si (KR);
Eui-Hwan Song, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 73 days.

(21) Appl. No.: 13/242,165

(22) Filed: Sep. 23, 2011

(65) Prior Publication Data

US 2012/0196181 A1    Aug. 2, 2012

(30) Foreign Application Priority Data

Jan. 28, 2011   (KR) .................. 10-2011-0008794

(51) Int. Cl.
*H01M 10/052* (2010.01)

(52) U.S. Cl.
USPC ...................................... 429/231.5

(58) Field of Classification Search
None
See application file for complete search history.

(56) References Cited

U.S. PATENT DOCUMENTS

| 5,316,875 | A | 5/1994 | Murai et al. |
| 7,521,151 | B2 | 4/2009 | Hwang et al. |
| 2004/0048157 | A1 | 3/2004 | Neudecker et al. |
| 2006/0257737 | A1 | 11/2006 | Goh et al. |
| 2007/0072081 | A1* | 3/2007 | Kitao et al. ............ 429/231.2 |
| 2007/0154810 | A1 | 7/2007 | Kim et al. |
| 2008/0118836 | A1 | 5/2008 | Hwang et al. |
| 2008/0166637 | A1* | 7/2008 | Inagaki et al. .......... 429/329 |

FOREIGN PATENT DOCUMENTS

| JP | 10116628 | 5/1998 |
| JP | 2005-209499 | 8/2005 |
| JP | 3950958 | 5/2007 |
| JP | 2008-547156 | 12/2008 |
| KR | 10-0125148 | 10/1997 |
| KR | 10-0570677 | 4/2006 |
| KR | 10-2008-0029479 | 4/2008 |
| KR | 10-2008-0049157 | 6/2008 |

OTHER PUBLICATIONS

K. Nassau et al., 'The Quenching and Electrochemical Behavior of Li2O-V2O5 Glasses', Journal of Non-Crystalline Solilds 44(1981) 294-304.
Korean Notice of Allowance issued by KIPO on Jul. 31, 2012, in connection with Korean Patent Application No. 10-2011-0008794 and Request for Entry of the Accompanying Office Action attached herewith.

* cited by examiner

*Primary Examiner* — Patrick Ryan
*Assistant Examiner* — Wyatt McConnell
(74) *Attorney, Agent, or Firm* — Robert E. Bushnell, Esq.

(57) ABSTRACT

Disclosed are a positive electrode for a rechargeable lithium battery and a rechargeable lithium battery including the same, and the positive electrode includes a current collector; and a positive active material layer including an additive which is $Li_xV_2O_5$ (1<x<4) or a composite of $Li_xV_2O_5$ (1<x<4) and metal oxide, and a positive active material, and being disposed on the current collector.

19 Claims, 1 Drawing Sheet

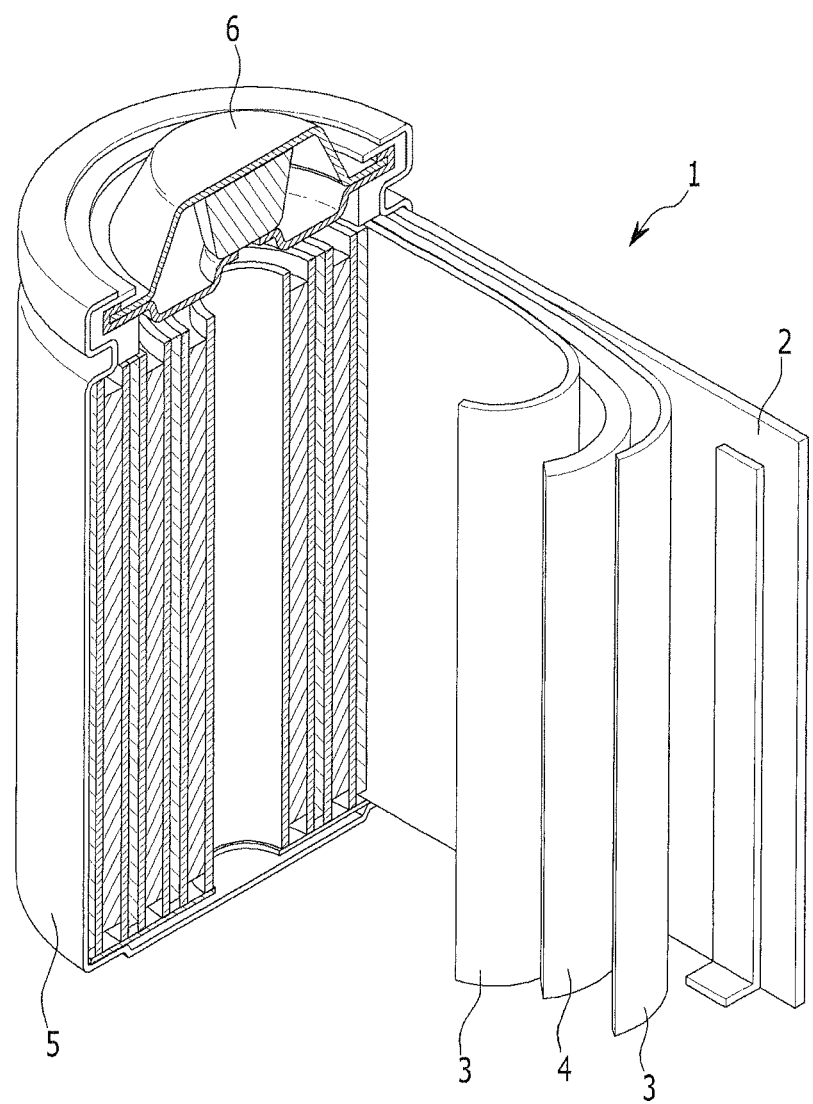

POSITIVE ELECTRODE FOR RECHARGEABLE LITHIUM BATTERY AND RECHARGEABLE LITHIUM BATTERY INCLUDING SAME

RELATED APPLICATIONS

This application claims priority to and the benefit of Korean Patent Application No. 10-2011-0008794 filed in the Korean Intellectual Property Office on Jan. 28, 2011, the entire contents of which are incorporated herein by reference.

BACKGROUND

1. Field

This disclosure relates to a positive electrode for a rechargeable lithium battery and a rechargeable lithium battery including the same.

2. Description of the Related Art

Lithium rechargeable batteries have recently drawn attention as a power source for small portable electronic devices. They use an organic electrolyte solution and thereby have twice the discharge voltage of a conventional battery using an alkaline aqueous solution, and accordingly have high energy density.

For positive active materials of a rechargeable lithium battery, lithium-transition element composite oxides being capable of intercalating lithium, such as $LiCoO_2$, $LiMn_2O_4$, $LiNi_{1-x}Co_xO_2$ ($0<x<1$), and so on, have been researched.

As for negative active materials of a rechargeable lithium battery, various carbon-based materials such as artificial graphite, natural graphite, and hard carbon, which can intercalate and deintercalate lithium ions. However, the carbon-based negative active material generates irreversible capacity; lithium corresponding to the irreversible capacity of the negative electrode is deficient in a positive electrode; and potential ($Li/Li^+$) of positive electrode is increased. The increasing potential of positive electrode may deteriorate the cycle-life.

Recently, the demands on a high energy density battery are increasing. For this purpose, there are attempts to use the negative active material including Si, Sn, Ge, the oxide thereof, or the alloy thereof capable of being alloyed with lithium having a higher theoretical capacity density than carbon-based material. However, the negative active material generally has inferior initial efficiency than the graphite negative active material, and it may generate the irreversible capacity that lithium inserted during the initial charge and discharge is not deintercalated during the discharge.

In addition, in the high power battery for an automobile or the like, amorphous carbon (Hard Carbon etc.) is considered as a negative active material since it has high power-high input characteristics. However, the amorphous carbon negative active material has bad discharge efficiency to the initial charge compared to graphite, so it may deteriorate the energy density of battery.

All these problems may be caused by the bad initial discharge to the initial charge of negative electrode which is irreversible capacity and by the deterioration of the initial discharge efficiency. In order to improve the irreversible capacity of negative electrode, the following methods are recently reviewed: adhering lithium to negative active material; or using nitride ($Li_{1+x}M_yN$, M is a transition element, x is within a range of -0.2 to 2.0, and y is within a range of 0.1 to 0.5) for a negative electrode.

However, the negative electrode including the lithium or lithium-included material is generally highly reactive with moisture and oxygen in the air and has problems on the safety of manufacturing process, so it is not practical.

SUMMARY

One aspect of the present invention provides a positive electrode for a rechargeable lithium battery having an excellent initial charge and discharge efficiency and an excellent reliability since it may compensate the irreversible capacity of negative electrode.

Another aspect of the present invention provides a rechargeable lithium battery including the positive electrode.

According to one embodiment of the present invention, a positive electrode for a rechargeable lithium battery is provided that includes a current collector; and a positive active material layer including a positive active material and an additive including $Li_xV_2O_5$ where $1<x<4$, a composite of $Li_xV_2O_5$ where $1<x<4$ and metal oxide or a combination thereof, the positive active material disposed on the current collector, wherein a part of vanadium in $Li_xV_2O_5$ ($1<x<4$) or the composite of $Li_xV_2O_5$ ($1<x<4$) and the metal oxide is optionally substituted with an element of Al, Mg, Zr, Ti, Sr, Cu, Co, Ni, Mn, or a combination thereof.

The additive may be included in about 0.5 wt % to about 50 wt % based on the weight of positive active material.

The metal oxide may include $Na_2O$, $K_2O$, $MgO$, $ZnO$, $CaO$, $BaO$, $SnO$, $GeO$, $SiO_2$, $GeO_2$, $SnO_2$, $B_2O_3$, $Al_2O_3$, $Sb_2O_3$, $Bi_2O_3$, $Nb_2O_5$, or a combination thereof.

The positive active material layer may further include an activated carbon.

In addition, in $Li_xV_2O_5$ ($1<x<4$) for the additives, a part of vanadium may be substituted with an element of Al, Mg, Zr, Ti, Sr, Cu, Co, Ni, Mn, or a combination thereof.

The positive active material may be at least one of compounds represented by the following Chemical Formulae 1 to 5.

| | |
|---|---|
| $LiMO_2$ | [Chemical Formula 1] |
| $LiMPO_4$ | [Chemical Formula 2] |
| $Li_2MPO_3F$ | [Chemical Formula 3] |
| $Li_2MSiO_4$ | [Chemical Formula 4] |
| $LiMn_2O_4$ | [Chemical Formula 5] |

In Chemical Formulae 1 to 5, M is Co, Ni, Mn, Fe, or a combination thereof.

The additive may be crystalline or amorphous.

The additive has a lower lithium oxidation potential than the lithium oxidation potential ($Li/Li^+$) of the positive active material, particularly, it may have a lower lithium oxidation potential than the lithium oxidation potential ($Li/Li^+$) of the positive active material by about 0.2V to about 2.5V.

In addition, the additive may have a lithium oxidation potential of about 1.5 V to about 3.5 V.

A compound selected from LiOH, $Li_2O$, and a combination thereof may be present on the surface of additive, and the compound may be included in about 5 parts by weight to about 1 parts by weight based on 100 parts by weight of additive.

According to another embodiment of the present invention, a rechargeable lithium battery including a negative electrode including a negative active material, the positive electrode, and a non-aqueous electrolyte is provided.

According to yet another embodiment of the present invention, a positive electrode for a rechargeable lithium battery includes a current collector; and a positive active material layer including a positive active material and an additive including one selected from the group consisting of $Li_xV_2O_5$ where $1<x<4$, a composite of $Li_xV_2O_5$ where $1<x<4$ and metal oxide, $Li_xV_{2-y}O_5$ ($1<x<4$, $0.02<y\leq0.5$), a composite of $Li_xV_{2-y}O_5$ and metal oxide and a combination thereof, the positive active material disposed on the current collector.

BRIEF DESCRIPTION OF THE DRAWING

FIG. 1 is a schematic view of a rechargeable lithium battery according to one embodiment.

DETAILED DESCRIPTION

Exemplary embodiments of the present invention will hereinafter be described in detail. However, these embodiments are only exemplary, and the present invention is not limited thereto.

One embodiment of the present invention provides a positive electrode for a rechargeable lithium battery that includes a current collector; and a positive active material layer including a positive active material and an additive of $Li_xV_2O_5$ ($1<x<4$) or a composite of $Li_xV_2O_5$ ($1<x<4$) and metal oxide, and being disposed on the current collector.

In the additive, the lithium mole ratio of x may have a range of more than 1 and less than 4, for example, more than 1 and less than 3.5. The additive discharges lithium ions during the initial charge and discharge of rechargeable lithium battery to play a role of the sacrifice positive electrode, which compensates the irreversible capacity of lithium generated from the negative electrode.

When x is 1 (i.e., the additive is $LiV_2O_5$), the additive may not compensate the irreversible capacity of lithium. $LiV_2O_5$ has a theoretical capacity of 41 mAh/g; $Li_2V_2O_5$ has a theoretical capacity of 273 mAh/g; and $Li_3V_2O_6$ has a theoretical capacity of 396 mAh/g. In the view of energy density, it is not suitable to use an additive of $LiV_2O_5$ wherein x is 1. Particularly, in the case of widely used positive active material of $LiCoO_2$, the theoretical capacity is 273 mAh/g, but the actual capacity is 140 mAh/g to 150 mAh/g since Li is actually activated in half. Thereby, it may not obtain an effect on increasing the capacity, which is an effect on increasing the energy density, even if using $LiV_2O_5$.

If x is 4 or more, impurity such as alkali component (LiOH, $Li_2O$ or the like) is mixed, so the composition for the active material layer may be formed into a gel, and it may accelerate the side-reaction with an electrolyte. Thereby, it may generate gas and deteriorate the cycle-life characteristics of battery.

Since the additive includes vanadium capable of continuously changing within the oxidation number range of divalent, trivalent, quadrivalent, and pentavalent, it may stably maintain more lithium than in the positive active material and prevent the generation of impurities of lithium oxide, lithium hydroxide, lithium carbonate, $Li_2O$, $Li_2CoO_3$ or the like. Thereby, it may have lithium in a stable structure of $Li_xV_2O_5$ or $Li_xV_2O_5-P_2O_5$.

The lithium ion discharge of the additive means that lithium is oxidized in the lower potential ($Li/Li^+$) than the positive active material when the rechargeable lithium battery is charged and discharged at 0.05 C to 0.2 C for one to three times (initial charge and discharge, generally referred to formation process). In other words, the additive according to one embodiment has lower oxidation potential ($Li/Li^+$) than the positive active material, for example, a lower oxidation potential ($Li/Li^+$) than that of the positive active material by about 0.2 V to 2.5 V. The additive may have an oxidation potential ($Li/Li^+$) of about 1.5V to about 3.5V. Since the oxidation potential of additive is lower than the positive active material, lithium ion may be deintercalated from the additive prior to the positive active material during the initial charge and discharge of rechargeable lithium battery. Accordingly, even if the lithium ion deintercalated from the positive electrode is inserted into the negative active material of negative electrode, and then it is not deintercalated, the total amount of transferring lithium ion in the rechargeable lithium battery is not decreased. In other words, it may compensate the irreversible capacity of negative electrode. In addition, when all lithium is deintercalated from the additive, the additive may be present as the stable $V_2O_5$, so it may prevent the crystal collapse and the oxygen production. Accordingly, the positive electrode is not adversely affected by further adding the additive to the positive electrode.

In addition, generally, since irreversible lithium is generated during the charge and discharge of battery, the oxidation potential ($Li/Li^+$) of the positive active material is increased. However, as described in above, the additive may suppresses the irreversible lithium, so it may relatively decrease the oxidation potential ($Li/Li^+$) of positive active material. Since it may suppress the irreversible lithium as in above, it may improve the battery capacity and relatively decrease the oxidation potential ($Li/Li^+$) of positive active material. Resultantly, it may prevent causing the high voltage state during the charging the positive electrode, so it may prevent the degeneration of positive electrode to improve the reliability such as cycle-life characteristics or the like.

The additive may have an initial charge and discharge efficiency of 10% or more, 80% or less. The initial charge and discharge efficiency of the additive is calculated as follows. The additive is used as an active material to provide an electrode, and lithium metal is used as a counter electrode to provide a half-cell. Then, it is charged at 0.02 C to 0.05 C until 4.2V for 1 to 3 times and discharged at 0.02 C to 0.05 C until 2.5V for 1 to 3 times. The initial charge and discharge efficiency ((discharge capacity/charge capacity)*100) means the value that is calculated from the measured charge capacity and discharge capacity.

The additive may be amorphous or crystalline. When the positive electrode according to one embodiment is used for a rechargeable lithium battery having a low discharge cut-off voltage (1.5-2V), the additive may be an amorphous additive since it may improve the reversibility to the charge and discharge. When using the amorphous additive, the additive may be a composite of $Li_xV_2O_5$ ($1<x<4$) and metal oxide. However, when the positive electrode according to one embodiment is used for a rechargeable lithium battery having a discharge cut-off voltage of 3V, both the amorphous and the crystalline are used. However, the crystalline may be more suitable in the view of process simplification and the cost.

In one embodiment of the present invention, the metal oxide may include $Na_2O$, $K_2O$, MgO, ZnO, CaO, BaO, SnO, GeO, $SiO_2$, $GeO_2$, $SnO_2$, $B_2O_3$, $Al_2O_3$, $Sb_2O_3$, $Bi_2O_3$, $Nb_2O_5$, or a combination thereof.

In one embodiment of the present invention, the additive may have an average particle diameter of 1 μm to 30 μm. When the additive has an average particle diameter within the range, it may appropriately show the effects obtained by using the additive without deteriorating the electrode density and causing the uneven of electrode surface.

In one embodiment of the present invention, the compound selected from LiOH, $Li_2O$, and a combination thereof may be present as an impurity on the surface of the additive to stabilize the additive surface. The compound may be included in 1 part by weight to 5 parts by weight based on 100 parts by weight of the additive.

In one embodiment of the present invention, the additive may be included in 0.5 wt % to 50 wt % based on the total amount of positive active material. In other words, when the positive active material weight is considered as 100 wt %, the additive weight may range from 0.5 to 50 wt % based on the 100 wt %. When the additive is present in the positive electrode within the range, it may effectively compensate the lithium loss due to the irreversible capacity of negative electrode, and the positive active material may be used at an appropriate amount.

The positive active material may be, for example, at least one of compounds represented by the following Chemical Formulae 1 to 5.

$$LiMO_2 \quad \text{[Chemical Formula 1]}$$

$$LiMPO_4 \quad \text{[Chemical Formula 2]}$$

$$Li_2MPO_3F \quad \text{[Chemical Formula 3]}$$

$$Li_2MSiO_4 \quad \text{[Chemical Formula 4]}$$

$$LiMn_2O_4 \quad \text{[Chemical Formula 5]}$$

In Chemical Formulae 1 to 5, M is Co, Ni, Mn, Fe, or a combination thereof.

The positive active material layer according to another embodiment may further include an activated carbon together with the additive. When the activated carbon is further included in the positive active material layer, it may further effectively maintain the high power characteristics.

The activated carbon may be included in 2 parts by weight to 25 parts by weight based on entire 100 parts by weight of positive active material, additive, binder, and conductive material.

In addition, the activated carbon may have a specific surface area of 100 $m^2/g$ to 1800 $m^2/g$. When the activated carbon has the specific surface area within the range, the area of adsorbing anion and cation is greater so that it is good for the high-speed charge and discharge and easily forming a positive active material layer including the activated carbon.

In addition, the activated carbon may have an average particle diameter of 3 μm to 20 μm. When the activated carbon has an average particle diameter within the range, it may provide a positive active material layer that the activated carbon is further uniformly dispersed in an appropriate electrode thickness.

A part of vanadium in $Li_xV_2O_5$ (1<x<4) may be substituted with an element of Al, Mg, Zr, Ti, Sr, Cu, Ni, Mn, Co, or a combination thereof. The case of substituting a part of vanadium with other element may be represented by Chemical Formula, $Li_xV_{2-y}M_yO_5$ (1<x<4, 0.02<y≤0.5, M is Al, Mg, Zr, Ti, Sr, Cu, Co, Ni, Mn or a combination thereof). When a part of vanadium is substituted with other element in the $Li_xV_2O_5$ (1<x<4) for the additive, it may further suppress the dissolution.

The positive active material layer may include a binder and a conductive material as well as the additive and positive active material. The positive active material may be included in an amount of 80 wt % to 95 wt % and 1 wt % to 10 wt % of the binder and conductive material, respectively, based on the total weight of the positive active material layer.

The binder improves binding properties of the positive active material particles to each other and to a current collector. Examples of the binder include at least one selected from the group consisting of polyvinyl alcohol, carboxylmethyl cellulose, hydroxypropyl cellulose, diacetyl cellulose, polyvinylchloride, carboxylated polyvinylchloride, polyvinylfluoride, a polymer including ethylene oxide, polyvinylpyrrolidone, polyurethane, polytetrafluoroethylene, polyvinylidenefluoride, polyethylene, polypropylene, styrene-butadiene rubber, acrylated styrene-butadiene rubber, an epoxy resin, nylon, and the like, but is not limited thereto.

The conductive material may be any conductive material that is generally used for a rechargeable lithium battery. Examples of the conductive material include a carbon-based material such as natural graphite, artificial graphite, carbon black, acetylene black, ketjen black, carbon fiber, and the like; a metal-based material including a metal powder or a metal fiber including copper, nickel, aluminum, silver, and the like; a conductive polymer such as a polyphenylene derivative and the like; or a mixture thereof.

The current collector may be Al foil but is not limited thereto.

The positive electrode may be fabricated in a method including mixing a positive active material, an additive, a binder, and a conductive material in a solvent to prepare a positive active material composition, followed by coating the composition on a current collector, drying, and compressing. The solvent includes N-methylpyrrolidone and the like, but is not limited thereto. The positive electrode manufacturing method is well known and is thus not described in detail in the present specification.

According to another embodiment of the present invention, a rechargeable lithium battery includes a negative electrode including a negative active material, the positive electrode, and a non-aqueous electrolyte.

The negative electrode includes a negative active material layer including a negative active material and a current collector supporting the negative active material layer.

The negative active material includes a material that reversibly intercalates/deintercalates lithium ions, a lithium metal, a lithium metal alloy, a material being capable of doping and dedoping lithium, or a transition metal oxide.

The material that can reversibly intercalate/deintercalate lithium ions includes a carbon material. The carbon material may be any generally-used carbon-based negative active material in a lithium ion rechargeable battery. Examples of the carbon-based negative electrode active materials include thermally decomposed carbon, coke or graphite such as crystalline or amorphous carbon and carbon composites, and burnt organic polymer compounds, carbon fibers, tin oxide compounds, lithium metal, and alloys of lithium and other elements. Examples of the amorphous carbon may include hard carbon, coke, mesocarbon microbeads (MCMB) baked at 1500° C. or less, mesophase pitch-based carbon fiber (MPCF), and others. Examples of the crystalline carbon may include graphite-based materials, specifically natural graphite, graphitized coke, graphitized MCMB, graphitized MPCF, and others.

Examples of the lithium metal alloy include lithium and a metal selected from the group consisting of Na, K, Rb, Cs, Fr, Be, Mg, Ca, Sr, Si, Sb, Pb, In, Zn, Ba, Ra, Ge, Al, and Sn.

Examples of the material being capable of doping lithium include Si, $SiO_x$ (0<x<2), a Si-Q alloy (where Q is an element selected from the group consisting of an alkali metal, an alkaline-earth metal, a group 13 element, a group 14 element, a group 15 element, a group 16 element, a transition element, a rare earth element, and combinations thereof, and is not Si), Sn, $SnO_2$, a Sn—R alloy (where R is an element selected from the group consisting of an alkali metal, an alkaline-earth metal, a group 13 element, a group 14 element, a group 15 element, a group 16 element, a transition element, a rare earth element, and combinations thereof and is not Sn), or mixtures thereof. At least one of these materials may be mixed with $SiO_2$. The elements Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof. In addition, a carbon coating layer may further formed on the surface of the Si, $SiO_x$ (0<x<2) or Si-Q alloy negative active material. The carbon coating layer may be formed using any process for example, heat-treatment under a carbon gas atmosphere such as a methane gas. Thus detailed description of the formation process of the carbon coating layer is not provided.

The carbon coating layer may have a thickness of 5 nm to 100 nm.

Examples of the transition metal oxide include vanadium oxide, lithium vanadium oxide, and the like.

In the negative active material layer, the negative active material may be included in an amount of 95 wt % to 99 wt % based on the total weight of the negative active material layer.

The negative active material layer includes a binder, and optionally a conductive material. In the negative active material layer, the binder may be included in an amount of 1 wt % to 5 wt % based on the total weight of the negative active material layer. When the conductive material is further included, 90 wt % to 98 wt % of the negative active material, 1 wt % to 5 wt % of the binder, and 1 wt % to 5 wt % of the conductive material may be present.

The binder improves binding properties of negative active material particles with one another and with a current collector. The binder includes a non-water-soluble binder, a water-soluble binder, or a combination thereof.

The non-water-soluble binder includes polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, polyamideimide, polyimide, or a combination thereof.

The water-soluble binder includes a styrene-butadiene rubber, an acrylated styrene-butadiene rubber, polyvinylalcohol, sodium polyacrylate, a copolymer including propylene and a C2 to C8 olefin, a copolymer of (meth)acrylic acid and (meth) acrylic acid alkyl ester, or a combination thereof.

When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 to about 3 parts by weight based on 100 parts by weight of the binder.

The current collector includes a copper foil, a nickel foil, a stainless steel foil, a titanium foil, a nickel foam, a copper foam, a polymer substrate coated with a conductive metal, or combinations thereof.

The conductive material may be any conductive material that is generally used for a rechargeable lithium battery. Examples of the conductive material include a carbon-based material such as natural graphite, artificial graphite, carbon black, acetylene black, ketjen black, and carbon fiber; a metal-based material such as a metal powder or a metal fiber including copper, nickel, aluminum, and silver; a conductive polymer such as a polyphenylene derivative; and a mixture thereof.

The negative electrode may be fabricated in a method including mixing a negative active material, a binder, and optionally a conductive material in a solvent to prepare a negative active material composition, followed by coating the composition on a current collector, drying, and compressing. The solvent includes N-methylpyrrolidone or water, and the like, but is not limited thereto. The negative electrode manufacturing method is well known, and thus is not described in detail in the present specification.

The non-aqueous electrolyte includes a non-aqueous organic solvent and a lithium salt.

The non-aqueous organic solvent serves as a medium for transmitting ions taking part in the electrochemical reaction of the battery.

The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like, and examples of the ketone-based solvent include cyclohexanone and the like. Examples of the alcohol-based solvent include ethyl alcohol, isopropyl alcohol, and the like, and examples of the aprotic solvent include nitriles such as R—CN (where R is a C2 to C20 linear, branched, or cyclic hydrocarbon group that optionally include a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be controlled in accordance with a desirable battery performance.

The carbonate-based solvent may include a mixture of a cyclic carbonate and a linear carbonate. The cyclic carbonate and the chain carbonate are mixed together in the volume ratio of 1:1 to 1:9. When the mixture is used as an electrolyte, the electrolyte performance may be enhanced.

In addition, the non-aqueous organic electrolyte may further include mixtures of carbonate-based solvents and aromatic hydrocarbon-based solvents. The carbonate-based solvents and the aromatic hydrocarbon-based solvents may be mixed together in the volume ratio of 1:1 to 30:1.

The aromatic hydrocarbon-based organic solvent may be an aromatic hydrocarbon-based compound represented by the following Chemical Formula 9.

[Chemical Formula 9]

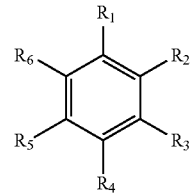

In Chemical Formula 9, $R_1$ to $R_6$ are independently hydrogen, a halogen, a C1 to C10 alkyl group, a C1 to C10 haloalkyl group, or a combination thereof.

The aromatic hydrocarbon-based organic solvent may include, but is not limited to, at least one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate or an ethylene carbonate-based compound of the following Chemical Formula 10.

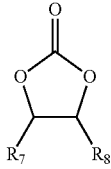

[Chemical Formula 10]

In Chemical Formula 10, $R_7$ and $R_8$ are independently hydrogen, a halogen, a cyano (CN), a nitro ($NO_2$), and a C1 to C5 fluoroalkyl, provided that at least one of $R_7$ and $R_8$ is a halogen, a cyano (CN), a nitro ($NO_2$), or a C1 to C5 fluoroalkyl, and $R_7$ and $R_8$ are not simultaneously hydrogen.

Examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The use amount of the additive for improving cycle life may be adjusted within an appropriate range.

The lithium salt supplies lithium ions in the battery, operates a basic operation of a rechargeable lithium battery, and improves lithium ion transportation between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bisoxalato borate, LiBOB). The lithium salt may be used in a concentration ranging from about 0.1 M to about 2.0 M. When the lithium salt is included at the above concentration range, electrolyte performance and lithium ion mobility may be enhanced due to optimal electrolyte conductivity and viscosity.

FIG. 1 is a schematic view of a schematic structure of a rechargeable lithium battery. FIG. 1 illustrates a cylindrical rechargeable lithium battery 1, which includes a negative electrode 2, a positive electrode 4, a separator 3 interposed between the negative electrode 2 and the positive electrode 4, an electrolyte (not shown) impregnating the separator 3, a battery case 6, and a sealing member 5 sealing the battery case 6.

The rechargeable lithium battery may further include a separator between the negative electrode and the positive electrode, as needed. Examples of suitable separator materials include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The following examples illustrate the present invention in more detail. These examples, however, should not in any sense be interpreted as limiting the scope of the present invention.

EXAMPLE 1

$Li_2CO_3$ (available from Aldrich) and $V_2O_5$ (available from Aldrich) available in the market were weighted in the same moles and mixed. The mixture was introduced into a heat resistance and chemical resistance Pt (platinum) crucible and heated until 750° C. under the air atmosphere. When the mixture was fused, it was removed from the crucible to provide a $Li_2V_2O_5$ having an average particle diameter of 20 μm.

5 wt % of the obtained $Li_2V_2O_5$, 90 wt % of $LiCoO_2$ having an average particle diameter of 20 μm, 2 wt % of acetylene black, and 3 wt % of polyvinylidene fluoride binder were mixed in N-methylpyrrolidone solvent to provide a positive active material slurry. The positive active material slurry was coated on both surfaces of Al foil having a thickness of 15 μm in 0.027 g/cm² per one surface to provide a positive electrode having an active mass density of 3.6 g/cc. The $Li_2V_2O_5$ had a lithium oxidation potential (Li/Li⁺) of average 3.3 V which is lower than the lithium oxidation potential (Li/Li⁺) of 3.8 V to 4.3 V of $LiCoO_2$ positive active material by 0.2 to 1.2 V.

95 wt % of natural graphite having an average particle diameter of 10 μm, 4 wt % of styrene butadiene rubber, and 1 wt % of carboxylmethyl cellulose were mixed into water solvent to provide a negative active material slurry. The negative active material slurry was coated on the both surfaces of Cu foil having a thickness of 10 μm in 0.013 g/cm² per one surface to provide a negative electrode having an active mass density of 1.5 g/cc.

The positive electrode and negative electrode were cut in cross-section, and a polyethylene separator having a thickness of 20 μm was interposed between the positive electrode and the negative electrode to provide an electrode assembly. Using the electrode assembly and an electrolyte, a 18650 type cylindrical battery cell was manufactured. It was controlled to provide the electrode assembly with a diameter of 96% with respect to 100% of battery case interior diameter.

The electrolyte was prepared by dissolving 1.3M of $LiPF_6$ into a mixed solvent (2:2:6 volume ratio) of ethylene carbonate, ethylmethyl carbonate, and dimethyl carbonate.

EXAMPLE 2

1.5 mol of $Li_2CO_3$ (available from Aldrich) and 1.0 mol of $V_2O_5$ (available from Aldrich) were weighted and mixed. The mixture was introduced into a heat resistance and chemical resistance Pt (platinum) crucible and heated until 750° C. under the air atmosphere. When the whole was fused, it was removed from the crucible to provide a $Li_3V_2O_5$ having an average particle diameter of 20 μm.

2 wt % of the obtained $Li_3V_2O_5$, 93 wt % of $LiCoO_2$ having an average particle diameter of 20 μm, 2 wt % of acetylene black, and 3 wt % of polyvinylidene fluoride binder were mixed in N-methylpyrrolidone solvent to provide a positive active material slurry. The $Li_3V_2O_5$ had a lithium oxidation potential (Li/Li) of average 3.0 V which is lower than the lithium oxidation potential (Li/Li⁺) of 3.8V to 4.3V of $LiCoO_2$ positive active material by 0.2 to 1.5 V.

A 18650 type cylindrical battery cell was manufactured in accordance with the same procedure as in Example 1, except that the positive active material slurry obtained according to the above was used.

EXAMPLE 3

2 wt % of $Li_2V_2O_5$ obtained from Example 1 having an average particle diameter of 20 μm, 93 wt % of $LiNiO_2$ having an average particle diameter of 20 μm, 2 wt % of acetylene black, and 3 wt % of polyvinylidene fluoride binder were mixed in N-methyl pyrrolidone solvent to provide a positive active material slurry. The $Li_2V_2O_5$ had a lithium oxidation potential (Li/Li$^+$) of average 3.0 V which is lower than the lithium oxidation potential (Li/Li$^+$) of 3.8V to 4.3 V of $LiNiO_2$ positive active material by 0.1 to 1.0 V.

A 18650 type cylindrical battery cell was manufactured in accordance with the same procedure as in Example 1, except that the positive active material slurry obtained according to the above was used to provide a positive electrode having an active mass density of 3.2 g/cc.

EXAMPLE 4

10 wt % of $Li_2V_2O_5$ obtained from Example 1, 85 wt % of $LiCoO_2$ having an average particle diameter of 20 μm, 2 wt % of acetylene black, and 3 wt % of polyvinylidene fluoride binder were mixed in N-methylpyrrolidone solvent to provide a positive active material slurry. A positive electrode was manufactured in accordance with the same procedure as in Example 1, except that the positive active material slurry obtained according to the above was used.

After curing the phenol resin, the cured product was baked at 1500° C. under the argon atmosphere. The baked product was ground to provide a hard carbon positive active material having an average particle diameter of 10 μm. 93 wt % of the resulting hard carbon negative active material, 2 wt % of acetylene black conductive material, and 5 wt % of polyvinylidene fluoride binder were mixed in N-methylpyrrolidone solvent to provide a negative active material slurry. The negative active material slurry was coated on the both surfaces of Cu foil having a thickness of 10 μm in 0.011 g/cm$^2$ per one surface to provide a negative electrode having an active mass density of 1.0 g/cc.

A 18650 type cylindrical battery cell was manufactured in accordance with the same procedure as in Example 1, except that the positive electrode and the obtained negative electrode obtained according to the above were used.

EXAMPLE 5

15 wt % of $Li_2V_2O_5$ obtained from Example 1, 80 wt % of $LiCoO_2$ having an average particle diameter of 20 μm, 2 wt % of acetylene black, and 3 wt % of polyvinylidene fluoride binder were mixed in N-methylpyrrolidone solvent to provide a positive active material slurry. A positive electrode was manufactured in accordance with the same procedure as in Example 1, except that the positive active material slurry obtained according to the above was used.

90 wt % of $SiO_x$ (x=0.1) having an average particle diameter of 5 μm and coated with carbon on its surface (having a thickness of about 20 nm to 30 nm), 3 wt % of acetylene black conductive material, and 7 wt % of polyimide binder were mixed in a N-methylpyrrolidone solvent to provide a negative active material slurry.

$SiO_x$ (x=0.1) coated with carbon on its surface was prepared by grinding $SiO_x$ (x=0.1, available from Aldrich) by a ball mill to provide an average particle diameter of 5 μm, introducing the ground $SiO_x$ (x=0.1) powder into a glass tube, heating the same until a temperature of 1200° C. under the argon atmosphere, replacing the atmosphere with the mixed gas (50:50 volume %) of methane gas and argon gas, and maintaining the same for about 0.5 hours. Thereby, it provided a product formed with a coating layer including carbide that the heat decomposed carbon of methane is coated around $SiO_x$ (x=0.1) particle.

The negative active material slurry was coated on the both surfaces on Cu foil having a thickness of 10 μm in 0.0035 g/cm$^2$ per one surface to provide a negative electrode having an active mass density of 1.0 g/cc.

A 18650 type cylindrical battery cell was manufactured in accordance with the same procedure as in Example 1, except that the positive electrode and the negative electrode obtained according to the above were used.

EXAMPLE 6

1 mol of $Li_2CO_3$, 1.0 mol of $V_2O_5$, and 0.01 mol of $P_2O_5$ available in the market were weighted and mixed. The mixture was introduced into a heat resistance and chemical resistance Pt (platinum) crucible and heated until 750° C. under the air atmosphere. When the whole was fused, it was removed from the crucible to provide a composite of $Li_2V_2O_5$ and $P_2O_5$ having an average particle diameter of 20 μm.

5 wt % of the obtained composite of $Li_2V_2O_5$ and $P_2O_5$, 90 wt % of $LiCoO_2$ having an average particle diameter of 20 μm, 2 wt % of acetylene black, and 3 wt % of polyvinylidene fluoride binder were mixed in N-methylpyrrolidone solvent to provide a positive active material slurry. The composite of $Li_2V_2O_5$ and $P_2O_5$ had a lithium oxidation potential (Li/Li$^+$) of average 3.3 V which is lower by 0.2 to 1.2 V than the lithium oxidation potential (Li/Li$^+$) of 3.8V to 4.3 V of $LiCoO_2$ positive active material.

A 18650 type cylindrical battery cell was manufactured in accordance with the same procedure as in Example 1, except that the positive electrode was manufactured by using the positive active material slurry obtained according to the above.

COMPARATIVE EXAMPLE 1

95 wt % of $LiCoO_2$ having an average particle diameter of 20 μm, 2 wt % of acetylene black, and 3 wt % of polyvinylidene fluoride binder were mixed in N-methyl pyrrolidone solvent to provide a positive active material slurry.

A 18650 type cylindrical battery cell was manufactured in accordance with the same procedure as in Example 1, except that the positive electrode was manufactured by using the positive active material slurry obtained according to the above.

COMPARATIVE EXAMPLE 2

0.5 mol of $Li_2CO_3$ and 1.0 mol of $V_2O_5$ available in the market were weighted and mixed. The mixture was introduced into a heat resistance and chemical resistance Pt (platinum) crucible and heated until 750° C. under the air atmosphere. When the whole was fused, it was removed from the crucible to provide $LiV_2O_5$ having an average particle diameter of 20 μm.

10 wt % of the obtained $LiV_2O_5$, 85 wt % of $LiCoO_2$ having an average particle diameter of 20 μm, 2 wt % of acetylene black, and 3 wt % of polyvinylidene fluoride binder were mixed in N-methylpyrrolidone solvent to provide a positive active material slurry.

A 18650 type cylindrical battery cell was manufactured in accordance with the same procedure as in Example 1, except that the positive electrode was manufactured by using the positive active material slurry obtained according to the above. The $LiV_2O_5$ had a lithium oxidation potential ($Li/Li^+$) of average 3.5 V which is lower than the lithium oxidation potential ($Li/Li^+$) of 3.8V to 4.3 V of $LiCoO_2$ positive active material by 0.2 to 0.7 V.

COMPARATIVE EXAMPLE 3

2.5 mol of $Li_2CO_3$ and 1.0 mol of $V_2O_5$ available in the market were weighted and mixed. The mixture was introduced into a heat resistance and chemical resistance Pt (platinum) crucible and heated until 750° C. under the air atmosphere. When the whole was fused, it was removed from the crucible to provide a $Li_5V_2O_5$ having an average particle diameter of 20 μm.

2 wt % of the obtained $Li_5V_2O_5$, 93 wt % of $LiCoO_2$ having an average particle diameter of 20 μm, 2 wt % of acetylene black, and 3 wt % of polyvinylidene fluoride binder were mixed in N-methylpyrrolidone solvent to provide a positive active material slurry. The $Li_5V_2O_5$ had a lithium oxidation potential ($Li/Li^+$) of average 3.0 V which is lower than the lithium oxidation potential ($Li/Li^+$) of 3.8V to 4.3 V of $LiCoO_2$ positive active material by 0.2 to 1.5 V.

A 18650 type cylindrical battery cell was manufactured in accordance with the same procedure as in Example 1, except that the positive electrode was manufactured by using the positive active material slurry obtained according to the above.

COMPARATIVE EXAMPLE 4

95 wt % of $LiNiO_2$ having an average particle diameter of 20 μm, 2 wt % of acetylene black, and 3 wt % of polyvinylidene fluoride binder were mixed in N-methyl pyrrolidone solvent to provide a positive active material slurry.

A 18650 type cylindrical battery cell was manufactured in accordance with the same procedure as in Example 1, except that the positive electrode was manufactured by using the positive active material slurry obtained according to the above.

COMPARATIVE EXAMPLE 5

95 wt % of $LiCoO_2$ having an average particle diameter of 20 μm, 2 wt % of acetylene black, and 3 wt % of polyvinylidene fluoride binder were mixed in N-methyl pyrrolidone solvent to provide a positive active material slurry. Using the positive active material slurry, a positive electrode was manufactured in accordance with the same procedure as in Example 1.

93 wt % of hard carbon negative active material having an average particle diameter 10 μm, 2 wt % of acetylene black conductive material, and 5 wt % of polyvinylidene fluoride binder were mixed in N-methylpyrrolidone solvent to provide a negative active material slurry. The negative active material slurry was coated on the both surfaces on Cu foil having a thickness of 10 μm in 0.011 $g/cm^2$ per one surface to provide a negative electrode having an active mass density of 1.0 g/cc.

A 18650 type cylindrical battery cell was manufactured in accordance with the same procedure as in Example 1, except that the positive electrode and the negative electrode obtained according to the above were used.

COMPARATIVE EXAMPLE 6

95 wt % of $LiCoO_2$ having an average particle diameter of 20 μm, 2 wt % of acetylene black, and 3 wt % of polyvinylidene fluoride binder were mixed in N-methyl pyrrolidone solvent to provide a positive active material slurry. Using the positive active material slurry, a positive electrode was manufactured in accordance with the same procedure as in Example 1.

90 wt % of $SiO_x$ (x=0.1: material used in Example 5) having an average particle diameter 5 μm and coated with carbon on its surface, 3 wt % of acetylene black conductive material, and 7 wt % of polyimide binder were mixed in N-methylpyrrolidone solvent to provide a negative active material slurry. The negative active material slurry was coated on the both surfaces on Cu foil having a thickness of 10 μm in 0.0035 $g/cm^2$ per one surface to provide a negative electrode having an active mass density of 1.0 g/cc.

A 18650 type cylindrical battery cell was manufactured in accordance with the same procedure as in Example 1, except that the positive electrode and the negative electrode obtained according to the above were used.

Measurement of Characteristics of Rechargeable Lithium Battery Cell

The cylindrical battery cells obtained from Examples 1 to 6 and Comparative Examples 1 to 6 were measured for the battery capacity, and the results are shown in the following Table 1.

In addition, the cylindrical battery cells obtained from Examples 1 to 6 and Comparative Examples 1 to 6 were charged in a constant current of 0.2 C until 4.2V, and they were charged in the constant voltage of 4.2 V with decreasing the charge current amount from 0.2 C (coulomb) to 0.05 C. The obtained capacity was designated as a charge capacity. After the charge, they were allowed to stand for about 20 minutes, and they were discharged in the constant current at 0.2 C until 2.5V. The obtained capacity is designated as a discharge capacity. After the first charge and discharge, the charge capacity to the discharge capacity ((initial discharge capacity/initial charge capacity)*100) was calculated to express the efficiency in the following Table 1.

In addition, the cylindrical battery cells obtained from Examples 1 to 6 and Comparative Examples 1 to 6 were charged and discharged at 45° C. and 1 C for 500 times, and the percent of discharge capacity at the 500 charge and discharge to the discharge capacity at the first charge and discharge was calculated and shown in the following Table 1 as a cycle-life characteristic.

TABLE 1

| | Positive electrode | | | | | | | |
|---|---|---|---|---|---|---|---|---|
| | Active material | Amount of active material (wt %) | Additive kinds | Amount | Positive active material | Capacity (Ah) | Efficiency (%) | Cycle-life (%) |
| Example 1 | $LiCoO_2$ | 90 | $Li_xV_2O_5$ x = 2 | 5 | graphite | 2.50 | 97 | 81 |
| Example 2 | $LiCoO_2$ | 93 | $Li_xV_2O_5$ x = 3 | 2 | graphite | 2.52 | 99 | 78 |
| Example 3 | $LiNiO_2$ | 93 | $Li_xV_2O_5$ x = 2 | 2 | graphite | 2.52 | 98 | 75 |
| Example 4 | $LiCoO_2$ | 85 | $Li_xV_2O_5$ x = 2 | 10 | hard carbon | 2.02 | 96 | 78 |
| Example 5 | $LiCoO_2$ | 80 | $Li_xV_2O_5$ x = 2 | 15 | $SiO_x$ (x = 0.1) | 3.42 | 97 | 73 |
| Example 6 | $LiCoO_2$ | 90 | Composite of $Li_xV_2O_5$ (x = 2) and $P_2O_5$ | 5 | graphite | 2.48 | 98 | 83 |
| Comparative Example 1 | $LiCoO_2$ | 95 | — | — | graphite | 2.38 | 92 | 58 |
| Comparative Example 2 | $LiCoO_2$ | 85 | $Li_xV_2O_5$ x = 1 | 10 | graphite | 2.38 | 92 | 60 |
| Comparative Example 3 | $LiCoO_2$ | 93 | $Li_xV_2O_5$ x = 5 | 2 | graphite | 2.51 | 99 | 31 |
| Comparative Example 4 | $LiNiO_2$ | 95 | — | — | graphite | 2.40 | 94 | 45 |
| Comparative Example 5 | $LiCoO_2$ | 95 | — | — | hard carbon | 1.70 | 81 | 56 |
| Comparative Example 6 | $LiCoO_2$ | 95 | — | — | $SiO_x$ (x = 0.1)$_1$ | 2.96 | 76 | 12 |

As shown in Table 1, it is confirmed that the cylindrical battery cell including the positive electrode obtained from Example 1 had a high initial charge and discharge efficiency and an excellent cycle-life characteristic.

In addition, it is understood that the cylindrical battery cell including the positive electrode obtained from Example 2 had the similar results to those of Example 1 even though using a small amount of additive of $Li_xV_2O_5$ (x=3).

Furthermore, the cylindrical battery cell including the positive electrode obtained from Example 3 showed a high effect due to using $LiNiO_2$ positive active material having a higher irreversible capacity even though using a small amount of additive.

The hard carbon or silicon oxide negative active material used in Examples 4 and 5 is an active material having a bad discharge efficiency to the initial charge, which shows an irreversible capacity of about 2.0% or more. However, the cylindrical battery cells including the positive electrode obtained from Examples 4 and 5 using an additive of $Li_xV_2O_5$ (x=2) compensated the lithium of irreversible capacity, so they showed excellent initial efficiency and cycle-life characteristics.

Even in the case of Example 6 using a composite of $Li_2V_2O_5$ and $P_2O_5$, it showed a high initial efficiency and excellent cycle-life characteristics.

Comparative Example 1 including no additive deteriorated the initial battery efficiency to some degree and showed degenerated cycle-life characteristics. This seems to be caused by generating the irreversible capacity of lithium, so resulting that the battery capacity was deteriorated. Furthermore, lithium of $Li_{1-x}CoO_2$ was deintercalated in x of 0.5 or more, so the lithium oxidation potential (Li/Li$^+$) of positive electrode was increased, and the lithium oxidation potential (Li/Li$^+$) of the fully charged positive electrode increased. Generally, since Li plays a role of column in a layered compound of $LiCoO_2$, it may easily collapsed by gradually decreasing Li. In addition, $Li_xCoO_2$ which is a trivalent is reduced by collapse to be changed into divalent cobalt oxide (CoO) and oxygen ($O_2$). This should be required to receive an electron so that it decomposes the electrolyte to receive the required electron. At the moment of collapsing $Li_{1-x}CoO_2$ structure, the battery capacity is decreased, and the electrolyte is oxidized, and the resulting oxidized and decomposed product is coated on a positive electrode surface, which is a resistance component. Thereby it may cause the polarization degradation.

Particularly, at a high temperature, the electrolyte is easily oxidized and decomposed on the $LiCoO_2$ surface causing the electrolyte depletion and the resistance increase to deteriorate the cycle-life characteristics. The positive electrodes according to Examples 1 to 6 is deintercalated until x of lithium is 0.5 or less in $Li_{1-x}CoO_2$ by further including the additive, so it may suppress that the electrolyte is oxidized on the $LiCoO_2$ surface at a high temperature, so it may suppress the structure collapse of positive electrode.

Comparative Example 2 including an additive of $LiV_2O_5$ compensated the lithium irreversible capacity too little to increase the battery capacity, and the cycle-life characteristics were also deteriorated compared to Examples 1 to 6.

Comparative Example 3 remarkably deteriorated the cycle-life characteristics. In Comparative Example 3 including an additive of $Li_5V_2O_5$, Li was present in excessive amount to generate impurities such as $Li_2O$ or LiOH or the like. It is considered that the impurity decomposed the electrolyte solution to be unstabilized, so the cycle-life characteristics were remarkably deteriorated.

Comparative Example 4 including no additive decreased the initial efficiency of battery in somewhat and degenerated the cycle-life. It means that the lithium irreversible capacity was generated, resultantly, the battery capacity was deteriorated. In addition, since Li was deintercalated in 0.8 or more when $LiCoO_2$ battery was charged at 4.2V, it was considerably unstable in full charge. It is considered that, at high temperature, the electrolyte was easily oxidized and decomposed on the $LiNiO_2$ surface, causing the electrolyte depletion and the resistance increase to deteriorate the cycle-life characteristics.

Hard carbon or silicon oxide negative active material used in Comparative Example 5 and Comparative Example 6 had the bad discharge efficiency to the initial charge, which generated the irreversible capacity of about 2.0% or more. In order to compensate the irreversible capacity, excessive Li was deintercalated from the positive electrode, so the positive electrode potential (Li/Li$^+$) was unexpectedly increased until the lithium oxidation potential (Li/Li$^+$) of 4.5V. Thereby, it is considered that the electrolyte was ultimately decomposed at the positive electrode to deteriorate the cycle-life characteristics.

EXAMPLE 7

10 wt % of $Li_2V_2O_5$ obtained from Example 1 having an average particle diameter of 20 μm, 70 wt % of $LiCoO_2$ having an average particle diameter of 20 μm, and 15 wt % of activated carbon having a specific surface area of 1200 m$^2$/g and an average particle diameter of 20 μm were mixed. The wt % is based on the entire solid 100 wt % of positive active material slurry. 95 wt % of the mixture, 2 wt % of acetylene black, and 3 wt % of polyvinylidene fluoride binder were mixed in N-methylpyrrolidone solvent to provide a positive active material slurry. The positive active material slurry was coated on the both surfaces on Al foil having a thickness of 15 μm in 0.015 g/cm$^2$ per one surface to provide a positive electrode having an active mass density of 3.0 g/cc.

Using the positive electrode, and the negative electrode obtained from Example 1, and the separator used in Example 1, an electrode assembly was manufactured. A 18650 type cylindrical battery cell was manufactured using the electrode assembly and an electrolyte. It was controlled to provide an electrode assembly with a diameter of 96% with respect to 100% of battery case interior diameter.

The electrolyte was prepared by dissolving 1.3M of $LiPF_6$ in a mixed solvent of ethylene carbonate, ethylmethyl carbonate, and dimethyl carbonate (2:2:6 volume ratio).

EXAMPLE 8

5 wt % of $Li_3V_2O_5$ obtained from Example 2 having an average particle diameter of 20 μm, 75 wt % of $LiCoO_2$ having an average particle diameter of 20 μm, and 15 wt % of activated carbon having a specific surface area of 1200 m$^2$/g and an average particle diameter of 20 μm were mixed. The wt % is based on the entire solid 100 wt % of positive active material slurry.

95 wt % of the mixture, 2 wt % of acetylene black, and 3 wt % of polyvinylidene fluoride binder were mixed in N-methylpyrrolidone solvent to provide a positive active material slurry.

A 18650 type cylindrical battery cell was manufactured in accordance with the same procedure as in Example 7, except that the obtained positive active material slurry obtained according to the above was used.

EXAMPLE 9

5 wt % of $Li_2V_2O_5$ obtained from Example 1 and having an average particle diameter of 20 μm, 75 wt % of $LiNiO_2$ having an average particle diameter of 20 μm, and 15 wt % of activated carbon having a specific surface area of 1200 m$^2$/g and an average particle diameter of 20 μm were mixed. The wt % is based on the entire solid 100 wt % of positive active material slurry.

95 wt % of the mixture, 2 wt % of acetylene black, and 3 wt % of polyvinylidene fluoride binder were mixed in N-methylpyrrolidone solvent to provide a positive active material slurry.

A 18650 type cylindrical battery cell was manufactured in accordance with the same procedure as in Example 7, except that the positive electrode having a active mass density of 3.2 g/cc was prepared by using the positive active material slurry obtained according to the above.

EXAMPLE 10

10 wt % of $Li_2V_2O_5$—$P_2O_5$ obtained from Example 6 having an average particle diameter of 20 μm, 70 wt % of $LiCoO_2$ having an average particle diameter of 20 μm, 2 wt % of acetylene black, 3 wt % of polyvinylidene fluoride binder, and 15 wt % of activated carbon having a specific surface area of 1200 m$^2$/g were mixed in N-methylpyrrolidone solvent to provide a slurry.

A 18650 type cylindrical battery cell was manufactured in accordance with the same procedure as in Example 7, except that the positive electrode was prepared by using the positive active material slurry obtained according to the above.

COMPARATIVE EXAMPLE 7

80 wt % of $LiCoO_2$ having an average particle diameter of 20 μm, 15 wt % of activated carbon having a specific surface area of 1200 m$^2$/g and an average particle diameter of 20 μm, 2 wt % of acetylene black, and 3 wt % of polyvinylidene fluoride binder were mixed in N-methylpyrrolidone solvent to provide a positive active material slurry. A 18650 type cylindrical battery cell was manufactured in accordance with the same procedure as in Example 7, except that the positive electrode was prepared by using the positive active material slurry obtained according to the above.

COMPARATIVE EXAMPLE 8

10 wt % of $LiV_2O_5$ obtained from Comparative Example 2 having an average particle diameter of 20 μm, 70 wt % of $LiCoO_2$ having an average particle diameter of 20 μm, and 15 wt % of activated carbon having a specific surface area of 1200 m$^2$/g and an average particle diameter of 20 μm were mixed to provide a mixture. The wt % is based on the entire solid 100 wt % of positive active material slurry. 95 wt % of the mixture, 2 wt % of acetylene black, and 3 wt % of polyvinylidene fluoride binder were mixed in N-methylpyrrolidone solvent to provide a positive active material slurry.

A 18650 type cylindrical battery cell was manufactured in accordance with the same procedure as in Example 7, except that the positive electrode was prepared by using the positive active material slurry obtained according to the above.

COMPARATIVE EXAMPLE 9

2 wt % of $Li_5V_2O_5$—$P_2O_5$ obtained from Comparative Example 3 and having an average particle diameter of 20 μm, 78 wt % of $LiCoO_2$ having an average particle diameter of 20 μm, and 15 wt % of activated carbon having a specific surface area of 1200 m$^2$/g and an average particle diameter of 20 μm were mixed. The wt % is based on the entire solid 100 wt % of positive active material slurry.

95 wt % of the mixture, 2 wt % of acetylene black, and 3 wt % of polyvinylidene fluoride binder were mixed in N-methylpyrrolidone solvent to provide a positive active material slurry.

A 18650 type cylindrical battery cell was manufactured in accordance with the same procedure as in Example 7, except that the positive electrode was prepared by using the positive active material slurry obtained according to the above.

COMPARATIVE EXAMPLE 10

80 wt % of $LiNiO_2$ having an average particle diameter of 20 μm, 15 wt % of activated carbon having a specific surface area of 1200 $m^2/g$ and an average particle diameter of 20 μm, 2 wt % of acetylene black, and 3 wt % of polyvinylidene fluoride binder were mixed in N-methylpyrrolidone solvent to provide a positive active material slurry.

A 18650 type cylindrical battery cell was manufactured in accordance with the same procedure as in Example 7, except that the positive electrode was prepared by using the positive active material slurry obtained according to the above.

The cylindrical battery cells obtained from Examples 7 to 10 and Comparative Examples 7 to 10 were measured for the battery capacity, and the results are shown in the following Table 1.

In addition, the cylindrical battery cells obtained from Examples 7 to 10 and Comparative Examples 7 to 10 were charged in a constant current of 1 C until 4.2V, and they were charged in the constant voltage of 4.2V with decreasing the charge current amount from 0.2 C (coulomb) to 0.05 C. After the charge, they were allowed to stand for about 10 minutes, and they were discharged in the constant current at 1.0 C until 3.0V. After repeating the charge and discharge for five times, the charge capacity and discharge capacity were observed, respectively. The charge capacity to the discharge capacity ((initial discharge capacity/initial charge capacity)*100) was calculated to express the efficiency in the following Table 2.

In addition, the cylindrical battery cells obtained from Examples 7 to 10 and Comparative Examples 2, 3, and 7 to 10 were charged at 45° C. and 1.0 C, 4.2V cut-off constant current, constant voltage and discharged in a constant current of 1.0 C and the constant voltage and discharged at 1.0 C and the constant current of 3.0V for 500 times, and the percent of discharge capacity at the 500 times, so the percent of discharge capacity at 500th charge and discharge to the discharge capacity at the first charge and discharge was calculated and shown in the following Table 1 as a cycle-life characteristic.

In addition, the cylindrical battery cells obtained from Examples 1 to 6 and Comparative Examples 1 to 6 were charged in a constant current of 1.0 C until 4.2V, and they were charged in the constant voltage of 4.2V when reaching to 4.2V. The charge was completed when the current amount was decreased to 0.02 C. They were discharged in the constant current at 30 C, and the discharge was completed when reaching to 3.0V and measured for the discharge capacity at 30 C. 1.0 C discharge capacity was measured by performing the 1.0 C, 3.0V constant current discharge. By comparing the measured 30 C discharge capacity with the 1.0 C discharge capacity, the output characteristics were measured at 30 C/1.0 C (%), and the results are shown in Table 2.

TABLE 2

| | Positive Active material | Amount of active material (wt %) | Additive Kind | Additive Amount | Amount of activated carbon (wt %) | Capacity (Ah) | Efficiency (%) | 30 C/1 C (%) | Cycle-life (%) |
|---|---|---|---|---|---|---|---|---|---|
| Example 7 | $LiCoO_2$ | 70 | $Li_xV_2O_5$ x = 2 | 10 | 15 | 1.40 | 98 | 73 | 83 |
| Example 8 | $LiCoO_2$ | 75 | $Li_xV_2O_5$ x = 3 | 5 | 15 | 1.42 | 98 | 71 | 82 |
| Example 9 | $LiNiO_2$ | 75 | $Li_xV_2O_5$ x = 2 | 5 | 15 | 1.46 | 98 | 76 | 80 |
| Example 10 | $LiCoO_2$ | 70 | $Li_xV_2O_5$ x = 2-$P_2O_5$ | 10 | 15 | 1.39 | 96 | 73 | 86 |
| Comparative Example 2 | $LiCoO_2$ | 85 | $Li_xV_2O_5$ x = 1 | 10 | graphite | 2.38 | 92 | 10 | 60 |
| Comparative Example 3 | $LiCoO_2$ | 93 | $Li_xV_2O_5$ x = 5 | 2 | graphite | 2.51 | 99 | 6 | 31 |
| Comparative Example 7 | $LiCoO_2$ | 80 | — | — | 15 | 1.18 | 83 | 38 | 52 |
| Comparative Example 8 | $LiCoO_2$ | 70 | $Li_xV_2O_5$ x = 1 | 10 | 15 | 1.22 | 84 | 42 | 83 |
| Comparative Example 9 | $LiCoO_2$ | 78 | $Li_xV_2O_5$ x = 5 | 2 | 15 | 1.43 | 98 | 30 | 32 |
| Comparative Example 10 | $LiNiO_2$ | 80 | — | — | 15 | 1.21 | 84 | 46 | 60 |

As shown in Table 2, the cylindrical battery cells obtained from Examples 7 to 10 further including an activated carbon together with the additive had an excellent high-rate characteristic and remarkably improved the output characteristics. On the other hand, Comparative Examples 2 and 3 including the additive not pertaining to the present invention and no activated carbon had remarkably low high-rate characteristic.

In addition, the cylindrical battery cell including the positive electrode obtained from Example 7 had a high initial charge and discharge efficiency and an excellent cycle-life characteristic.

The cylindrical battery cell including the positive electrode obtained from Example 8 had the similar results to in Example 7 even though it included a small amount of $Li_xV_2O_5$ (x=3) additive.

In addition, since the cylindrical battery cell including the positive electrode obtained from Example 9 included a $LiNiO_2$ positive active material having a higher irreversible capacity of the positive electrode, it showed higher effects even though including a small amount of additive.

Example 10 including a composite of $Li_2V_2O_5$ and $P_2O_5$ showed a high initial efficiency and excellent cycle-life characteristics.

Comparative Example 7 including no additive deteriorated the initial efficiency of battery to some degree and degraded cycle-life characteristics. It seems to be caused by generating lithium irreversible capacity, and resultantly, the battery capacity was deteriorated. In addition, since lithium in $Li_{1-x}CoO_2$ is deintercalated in x of 0.5 or more, the lithium oxidation potential (Li/Li$^+$) of positive electrode was increased, and the lithium oxidation potential (Li/Li$^+$) of the fully charged positive electrode is increased. Generally, since Li acts as a column in the layered compound of $LiCoO_2$, the structure is easily collapsed by gradually decreasing Li. In addition, $Li_xCoO_2$ which is a trivalent is reduced by the collapse to change divalent cobalt oxide (CoO) and oxygen ($O_2$). This should be required to receive an electron so that it decomposes the electrolyte solution to receive the required electron. At the moment of collapsing $Li_{1-x}CoO_2$ structure, the battery capacity is decreased, and the electrolyte is oxidized and decomposed. The oxidized and decomposed product is coated on a positive electrode surface, which is a resistance component. Thereby it may cause the polarization degradation.

Comparative Example 8 including an additive of $LiV_2O_5$ too insufficiently compensated the lithium irreversible capacity to increase the battery capacity and deteriorated the cycle-life characteristic compared to Examples 7 to 10.

Comparative Example 9 remarkably deteriorated the cycle-life characteristics. $Li_5V_2O_5$ additive used in Comparative Example 9 included an excessive amount of Li, so as to easily generated impurities such as $Li_2O$ or LiOH or the like. It is considered that the impurity decomposed the electrolyte to be unstabilized, resultantly the cycle-life characteristics were remarkably deteriorated.

Comparative Example 10 including no additive deteriorated the initial efficiency of battery to some degree and deteriorated the cycle-life. It means that the lithium irreversible capacity was generated, and resultantly the battery capacity was deteriorated. In addition lithium was deintercalated in 0.8 or more when $LiCoO_2$ battery was charged at 4.2V, so that is was considerably unstable at the full charge state. It is considered that the electrolyte solution was easily oxidized and decomposed on the $LiNiO_2$ surface at a high temperature, causing the electrolyte depletion and the resistance increase. Thereby, the cycle-life characteristics were deteriorated.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive electrode for a rechargeable lithium battery, comprising:
   a current collector; and
   a positive active material layer comprising a positive active material and an additive comprising one of $Li_xV_2O_5$ where 1<x<4, a composite of $Li_xV_2O_5$ where 1<x<4 and metal oxide and a combination thereof, the positive active material being disposed on the current collector, a part of vanadium in the one of $Li_xV_2O_5$ where 1<x<4, the composite of $Li_xV_2O_5$ where 1<x<4 and the metal oxide and a combination thereof being substituted with an element selected from Al, Mg, Zr, Ti, Sr, Cu, Co, Ni, Mn, and a combination thereof.

2. The positive electrode for a rechargeable lithium battery as set forth in claim 1, the expression 1<x<3.5 replacing the expression 1<x<4.

3. The positive electrode for a rechargeable lithium battery of claim 1, x being 2.

4. The positive electrode for a rechargeable lithium battery of claim 1, x being 3.

5. The positive electrode for a rechargeable lithium battery of claim 1, the additive comprising the composite of $Li_xV_2O_5$ where 1<x<4 and the metal oxide.

6. The positive electrode for a rechargeable lithium battery of claim 1, the part of vanadium in the one of $Li_xV_2O_5$ where 1<x<4, the composite of $Li_xV_2O_5$ where 1<x<4 and the metal oxide and a combination thereof being substituted with an element selected from Al, Mg, Zr, Ti, Sr, Cu and a combination thereof.

7. The positive electrode for a rechargeable lithium battery of claim 1, the additive being included in about 0.5 wt % to about 50 wt % based on the total weight of positive active material.

8. The positive electrode for a rechargeable lithium battery of claim 1, the additive being crystalline.

9. The positive electrode for a rechargeable lithium battery of claim 1, the additive being amorphous.

10. The positive electrode for a rechargeable lithium battery of claim 1, the additive having less lithium oxidation potential than the lithium oxidation potential (Li/Li+) of the positive active material.

11. The positive electrode for a rechargeable lithium battery of claim 9, the additive having a lithium oxidation potential less than the lithium oxidation potential (Li/Li+) of the positive active material by 0.2 V to 2.5V.

12. The positive electrode for a rechargeable lithium battery of claim 1, the additive having a lithium oxidation potential of 1.5V to 3.5V.

13. The positive electrode for a rechargeable lithium battery of claim 1, the additive comprising the composite, the metal oxide comprising one of $Na_2O$, $K_2O$, MgO, ZnO, CaO, BaO, SnO, GeO, $SiO_2$, $GeO_2$, $SnO_2$, $B_2O_3$, $Al_2O_3$, $Sb_2O_3$, $Bi_2O_3$, $Nb_2O_5$ and a combination thereof.

14. The positive electrode for a rechargeable lithium battery of claim 1, the positive active material layer further comprising an activated carbon.

15. The positive electrode for a rechargeable lithium battery of claim 1, a compound selected from LiOH, $Li_2O$, and a combination thereof being present on the additive surface.

16. The positive electrode for a rechargeable lithium battery of claim 15, the compound being included in 1 part by weight to 5 parts by weight based on 100 parts by weight of the additive.

17. The positive electrode for a rechargeable lithium battery of claim 1, the positive active material comprising at least one of compounds represented by the following Chemical Formulae 1 to 5:

| | |
|---|---|
| $LiMO_2$ | [Chemical Formula 1] |
| $LiMPO_4$ | [Chemical Formula 2] |
| $Li_2MPO_3F$ | [Chemical Formula 3] |
| $Li_2MSiO_4$ | [Chemical Formula 4] |
| $LiMn_2O_4$ | [Chemical Formula 5], |

M in Chemical Formulae 1 to 5 being selected from Co, Ni, Mn, Fe, and a combination thereof.

18. A rechargeable lithium battery comprising:
   a negative electrode including a negative active material;
   a positive electrode of claim 1; and
   a non-aqueous electrolyte.

19. A positive electrode for a rechargeable lithium battery, comprising a current collector; and a positive active material layer comprising a positive active material and an additive comprising one selected from the group consisting of $Li_xV_2O_5$ where $1<x<4$, a composite of $Li_xV_2O_5$ where $1<x<4$ and metal oxide, $Li_xV_{2-y}O_5$ where $1<x<4, 0.02<y\leq0.5$, a composite of $Li_xV_{2-y}O_5$ and metal oxide and a combination thereof, the positive active material disposed on the current collector.

\* \* \* \* \*